(12) United States Patent
Xiao et al.

(10) Patent No.: US 11,331,794 B2
(45) Date of Patent: May 17, 2022

(54) INVERSE KINEMATICS SOLUTION SYSTEM FOR USE WITH ROBOTS

(71) Applicant: INSTITUTE OF COMPUTING TECHNOLOGY, Beijing (CN)

(72) Inventors: Hang Xiao, Beijing (CN); Yinhe Han, Beijing (CN); Ying Wang, Beijing (CN); Shiqi Lian, Beijing (CN)

(73) Assignee: INSTITUTE OF COMPUTING TECHNOLOGY, CHINESE ACADEMY OF SCIENCES, Beijing (CN)

( * ) Notice: Subject to any disclaimer, the term of this patent is extended or adjusted under 35 U.S.C. 154(b) by 281 days.

(21) Appl. No.: 16/609,511

(22) PCT Filed: Feb. 11, 2018

(86) PCT No.: PCT/CN2018/076258
§ 371 (c)(1),
(2) Date: Oct. 30, 2019

(87) PCT Pub. No.: WO2018/205707
PCT Pub. Date: Nov. 15, 2018

(65) Prior Publication Data
US 2020/0139541 A1   May 7, 2020

(30) Foreign Application Priority Data
May 9, 2017   (CN) .......................... 201710320404.2

(51) Int. Cl.
*B25J 9/16*   (2006.01)

(52) U.S. Cl.
CPC .................................. *B25J 9/1607* (2013.01)

(58) Field of Classification Search
None
See application file for complete search history.

(56) References Cited

U.S. PATENT DOCUMENTS

2016/0335790 A1\* 11/2016 Fleishman .............. G06T 17/10

FOREIGN PATENT DOCUMENTS

JP    H06314103 A  \* 11/1994

OTHER PUBLICATIONS

Samuel R. Buss, Introduction to Inverse Kinematics with Jacobian Transpose, Pseudoinverse and Damped Least Squares methods, Oct. 2009 (Year: 2009).\*

\* cited by examiner

*Primary Examiner* — Jeff A Burke
*Assistant Examiner* — Arslan Azhar
(74) *Attorney, Agent, or Firm* — Morgan, Lewis & Bockius LLP

(57) ABSTRACT

An inverse kinematics solution system for use with a robot, which is used for obtaining a joint angle value corresponding to a target pose value on the basis of an inputted target pose value and degree of freedom of a robot and which comprises: a parameters initialization module, an inverse kinematics scheduler, a Jacobian calculating unit, a pose updating unit and a parameters selector. The system is implemented by means of hardware and may quickly obtain motion parameters, which are used for controlling a robot, while reducing power consumption.

8 Claims, 5 Drawing Sheets

INVERSE KINEMATICS SOLUTION SYSTEM FOR USE WITH ROBOTS

RELATED APPLICATIONS

This application is the U.S. national stage application of International (PCT) Patent Application Serial No. PCT/CN2018/076258, filed Feb. 11, 2018, which claims the benefit of Chinese Application No. 201710320404.2, filed May 9, 2017. The entire disclosure of each of these applications is hereby incorporated by reference.

TECHNICAL FIELD

The present invention relates to the technical field of computers, and in particular to an inverse kinematics solution system for a multi-degree-of-freedom robot.

BACKGROUND OF THE PRESENT INVENTION

With the development of sensors, artificial intelligence, the Internet of Things and big data technologies, various advanced robots are used for industrial manufacture, or some highly-repetitive or dangerous tasks instead of human beings. Flexibility and operability are essential criteria for measuring robotic capability. More joints and a higher degree-of-freedom make the robot more powerful, allowing the robot to accomplish more tasks. The inverse kinematics plays a vital role in solving the control parameters of high degree-of-freedom robots, and thus becomes a research hotspot in robotics. However, due to the difficulty in inverse kinematics solution, slow calculation speed and other factors, the ability of robots to handle problems in real-time is seriously limited. Moreover, the calculation of the inverse kinematics consumes a large amount of energy, so the endurance is a huge challenge for mobile robots with limited battery power.

In the prior art, the inverse kinematics solution for robots is usually calculated by a CPU and a GPU. However, for a high-degree-of-freedom robot, the CPU calculation is very time-consuming and cannot satisfy the requirement for real-time control of the robot. Besides, the shortcoming of GPU-based approaches is the high cost and power consumption, which are infeasible in many practical scenarios.

SUMMARY OF THE PRESENT INVENTION

To overcome the deficiencies of the prior art, an objective of the present invention is to provide an inverse kinematics accelerator for a robot with high parallelism, low power consumption and high degree-of-freedom.

In accordance with an aspect of the present invention, an inverse kinematics solution system for a robot is provided, which is used for obtaining a joint angle value corresponding to a target pose value based on the input target pose value and degree-of-freedom of a robot, the system including:

a parameter initialization module configured to obtain an initial parameter value, the initial parameter value including an initial joint angle value, an initial pose value and an initial error value of the initial pose value relative to the target pose value;

an inverse kinematics scheduler configured to determine, based on the target pose value, whether to select a current joint angle value as a joint angle value corresponding to the target pose value or transmit the current joint angle value to a Jacobian calculation unit, wherein the current joint angle value is the initial joint angle value from the parameter initialization module or a joint angle value from a parameter selector;

the Jacobian calculation unit configured to obtain a Jacobian matrix and a Jacobian transposed matrix based on the received joint angle value;

pose update units configured to obtain a plurality of new joint angle values based on the Jacobian matrix and the Jacobian transposed matrix; and the parameter selector configured to select a joint angle value from the plurality of new joint angle values and transmit said joint angle value to the inverse kinematics scheduler.

In the system of the present invention, the parameter initialization module includes: a random signal generator configured to generate the initial joint angle value; a triangular square calculator and a matrix multiplier configured to obtain the initial pose value; and, an adder and a triangular square calculator configured to obtain the initial error value.

In the system of the present invention, the inverse kinematics scheduler determines whether to select the current joint angle value as a joint angle value corresponding to the target pose value or transmit the current joint angle value to the Jacobian calculation unit by comparing an error corresponding to the current joint angle value with a predetermined threshold, wherein the error corresponding to the current joint angle value refers to an error between a pose value corresponding to the current joint angle value and the target pose value.

In the system of the present invention, the Jacobian calculation unit includes a triangular square calculator and a matrix multiplier, which are configured to obtain the Jacobian matrix and the Jacobian transposed matrix.

In the system of the present invention, each of the pose update units includes: a parameter calculator configured to calculate a forward parameter; a variable update module configured to calculate an increment of a joint angle variable; a register configured to store the increment of the joint angle variable; a pose calculation module configured to calculate a new pose value according to the increment of the joint angle variable; an error calculator configured to calculate an error between the new pose value and the target pose value; and, a controller configured to control the execution of the variable update module, the register, the pose calculation module, and the error calculator.

In the system of the present invention, the parameter calculator calculates the forward parameter by use of a matrix multiplier.

In the system of the present invention, the matrix multiplier is a 4*4 matrix multiplier.

In the system of the present invention, the pose calculation module calculates a new pose by use of an adder and a triangular square calculator.

In the system of the present invention, the parameter selector includes: a comparator configured to compare a plurality of joint angle values; and, a data selector configured to select a joint angle value.

In the system of the present invention, there are at least two pose update units configured to execute the parallel calculation.

In the present invention, a robot with multiple joints and a high degree-of-freedom is taken as a research object to solve the problem of inverse kinematics solution of the robot, so as to provide the robot with parameters used for controlling the motion of the robot.

Compared with the prior art, the present invention has the following advantages: the parameters for controlling the motion of the robot are solved by a dedicated hardware system, so the power consumption for calculation is reduced; by using a highly-parallel system structure, the inverse kinematics solution can be effectively quickened to ensure the real-time control of the robot; and the present invention can be used to calculate the inverse kinematics problem of any degree-of-freedom, and is not limited to the control problem of a robot with a single degree-of-freedom, so the present invention is more versatile and widely applicable.

BRIEF DESCRIPTION OF THE DRAWINGS

The following drawings are merely schematically illustrative and explanatory of the present invention and are not intended to limit the scope of the present invention, in which.

DETAILED DESCRIPTION OF THE PRESENT INVENTION

To make the objectives, technical solutions, design methods and advantages of the present invention clearer, the present invention will be further described below in detail by specific embodiments with reference to the drawings. It should be understood that the specific embodiments described herein are merely for explaining the present invention rather than limiting the present invention.

Figure 1:
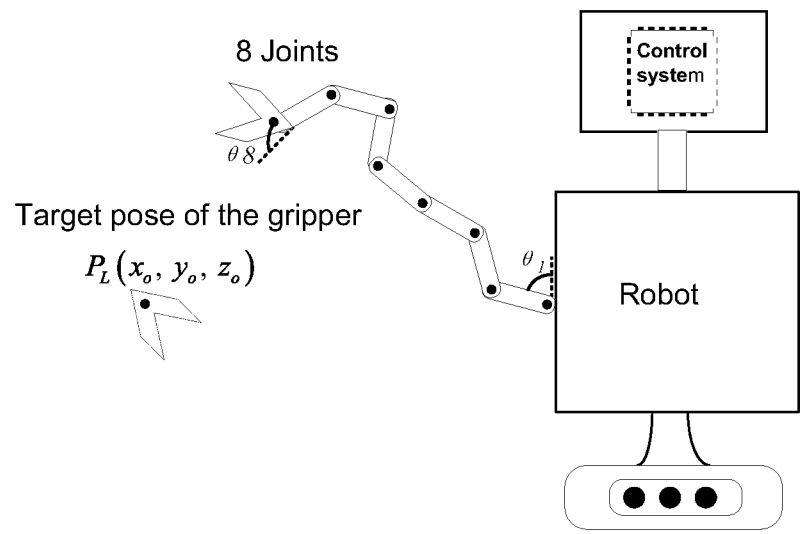
FIG. 1 shows a schematic diagram of a multi-degree-of-freedom robot.

The system of the present invention can be applied to the control of the mechanical arms of a multi-degree-of-freedom robot. The mechanical arm of the robot shown in FIG. 1 has 8 joints (i.e., 8 degrees of freedom). The motion of the robot can be controlled by controlling the rotation of each joint. The inverse kinematics solution for the mechanical arm means that an angle of each joint of the robot corresponding to a target pose is solved based on the target pose $P_L(x_o, y_o, z_o)$ of the robot's gripper. The association is generally used to establish, on the basis of the kinematics analysis on the mechanical arm, a relation equation between the target pose of the robot's gripper and the change in the angle of each joint, and the inverse kinematics solution is performed by means of a Jacobian matrix. The establishment of the relation equation and the detailed solution process of the Jacobian matrix belong to the prior art and will not be described here. The descriptions herein will focus on the system for realizing inverse kinematics solution for a robot by use of ASIC hardware.

The present invention is aimed at obtaining a joint angle corresponding to each joint, $\theta(\theta_1, \theta_2, \ldots \theta_8)$ (by taking 8 degrees of freedom as an example), by the system of the present invention when the target pose $P_L(x_o, y_o, z_o)$ of the robot is given. By inputting the obtained joint angles into the robot, the motion of the robot can be flexibly controlled. The control system in FIG. 1 may adopt the system of the present invention.

Figure 2:
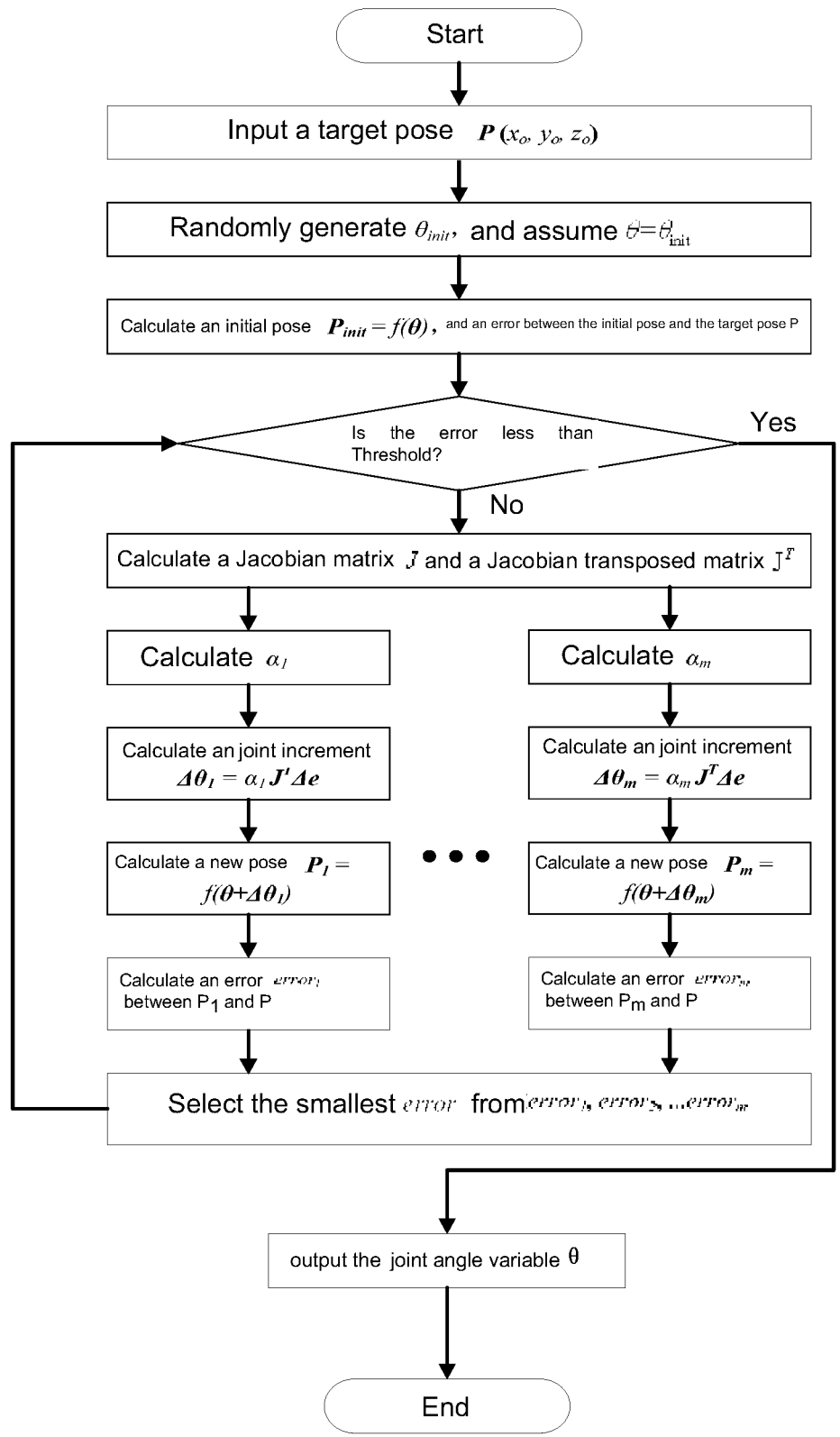
FIG. 2 shows a flowchart of an inverse kinematics solution process based on Jacobian transposition according to an embodiment of the present invention.

To facilitate the understanding of the hardware implementation of the present invention, FIG. 2 shows an inverse kinematics solution process based on Jacobian transposition according to the present invention.

Step 1: A target pose $P_L(x_o, y_o, z_o)$ is an input, where $x_0$, $y_0$, $z_0$ represent coordinate values in three directions.

Step 2: A set of initial values of a joint angle variable, $\theta_{init}$, is randomly generated, and the joint angle variable $\theta$ is assumed as $\theta=\theta_{init}$; an initial pose $P_{init}$ is calculated, and a pose variable is assumed as $P=P_{init}$; and, an initial error $\Delta e_{init}$ (i.e., an error between the initial pose and the target pose) is calculated, and an error variable is assumed as error=$\Delta e_{init}$.

Step 3: The error variable error is compared with a predetermined threshold to determine whether the precision requirement is satisfied, that is, error<Threshold; if the precision requirement is satisfied, the joint angle variable $\theta$ is an output; or otherwise, the following steps will be executed continuously.

Step 4: A Jacobian matrix J and a Jacobian transposed matrix $J^T$ are calculated according to the joint angle variable $\theta$.

Step 5: Forward parameters $\alpha_1, \alpha_2, \ldots, \alpha_k$ are calculated in parallel according to the J, $J^T$ and error, and a corresponding joint increment $\Delta\theta$ is solved.

Step 6: New poses $P_1, P_2, \ldots, P_k$ and errors $e_1, e_2, \ldots, e_k$ between the new poses and the target pose $P_L$ are calculated according to the $\Delta\theta$ and $\theta$.

Step 7: The smallest error and its corresponding joint angle variable $\theta$ are selected from $e_1, e_2, \ldots, e_k$, and the error variable error is made equal to the smallest error.

Step 8: It is determined whether the error satisfies the precision requirement, that is, error<Threshold; if the error satisfies the precision requirement, the joint angle variable $\theta$ is output; or otherwise, the process returns to the step 4 and will be continuously executed.

Figure 3:
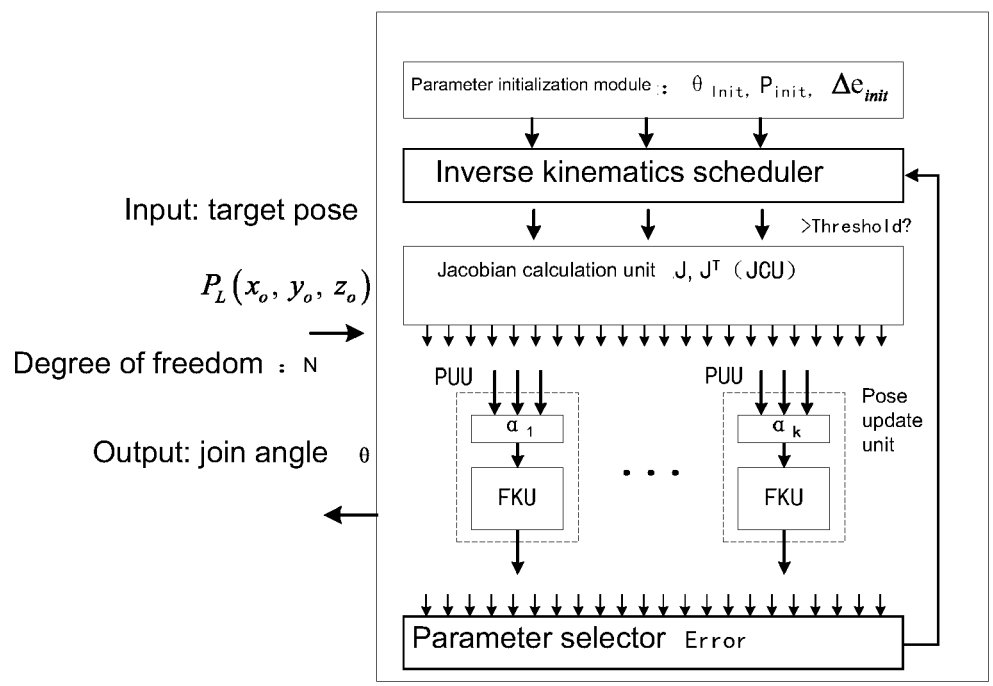
FIG. 3 shows a block diagram of an inverse kinematics solution system for a multi-degree-of-freedom robot according to an embodiment of the present invention.

FIG. 3 shows a block diagram of a multi-degree-of-freedom inverse kinematics solution system according to an embodiment of the present invention. The system includes a parameter initialization module, an inverse kinematics scheduler, a Jacobian calculation unit, pose update units and a parameter selector. The input of the system is a target pose $P_L(x_o, y_o, z_o)$ and the degree-of-freedom N, where the degree-of-freedom N may be any value. The output is respective joint angle values corresponding to the target pose.

The parameter initialization module is configured to randomly generate initial parameters, for example, initializing the joint angle variable $\theta_{init}$, calculating the initial poses $P_{init}$ and $\Delta e_{init}$, and the like. The parameter initialization module may be implemented by a random signal generator.

The inverse kinematics scheduler is configured to coordinate the scheduling and control of operational tasks in the whole system, for example, determining the size of the current error and the predetermined error threshold, controlling the number of iterations, and the like. The inverse kinematics scheduler may be implemented by a finite state machine, including a comparator, a data selector or the like.

The Jacobian calculation unit (JCU) is configured to calculate a Jacobian matrix corresponding to the joint angle variable and a transposed matrix thereof. The Jacobian calculation unit may be implemented by a triangular square calculator and a 4*4 matrix multiplier.

The pose update unit (PUU) is configured to calculate a new pose of the mechanical arm of the robot, the joint angle variables, and the corresponding error. A plurality of pose update units (e.g., 32) may be employed for parallel calculation. Each of the pose update units contains a parameter calculator and a forward kinematics calculator.

The parameter selector is configured to select the smallest error from a plurality of errors and return the smallest error to the inverse kinematics scheduler. The parameter selector may be implemented by a comparator or a sequencer.

Additionally, the system is further provided with an input/output interface. Each module contains a memory or a register for storing the intermediate calculation results or the parameters received from other modules. The parameters are transmitted among modules through a bus.

Specifically, the operation process executed by the system according to the present invention is as follows. The target pose $P_L(x_o, y_o, z_o)$ and the degree-of-freedom N (in this embodiment, N=8) are received from the outside of the system. The parameter initialization module randomly initializes the joint angle variable and calculates the initial pose. The Jacobian calculation unit calculates a Jacobian matrix corresponding to the joint angle variable and a transposed matrix thereof. The inverse kinematics scheduler controls, according to the degree-of-freedom N, the number of iterations of the triangular square or Jacobian matrix calculation. The pose update units calculate new poses, joint angle variables and corresponding errors in parallel. Meanwhile, according to whether the error error is less than the threshold Threshold, the inverse kinematics scheduler controls the number of iterations of the pose update units. The parameter selector selects the smallest error from a plurality of errors, and returns the smallest error to the inverse kinematics scheduler. During this process, when the inverse kinematics scheduler determines that the error error is less than the threshold Threshold, the iteration is stopped and the system is controlled to output joint angles, $\theta(\theta_1, \theta_2, \ldots \theta_8)$.

Figure 4:
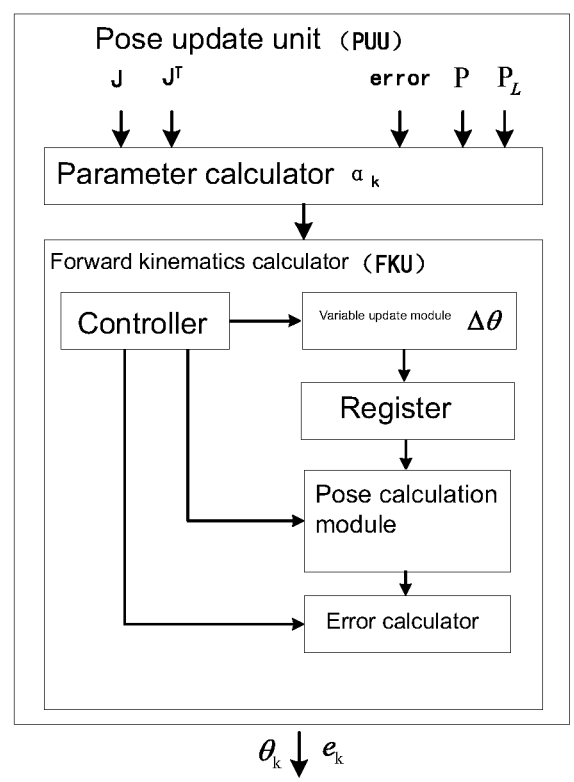
FIG. 4 shows a block diagram of a pose update unit according to an embodiment of the present invention.

To further understand the present invention, FIG. 4 shows a block diagram of the pose update unit in FIG. 3. Each of the pose update units (PUUs) includes a parameter calculator which may be implemented by a multiplier and an adder; and, a forward kinematics calculator (FKU). The forward kinematics calculator contains a controller, a variable update module, a register, a pose calculation module, and an error calculator.

The pose update units receive the Jacobian matrix J and the transposed matrix $J^T$ from the Jacobian calculation unit in FIG. 3, the error error, the current pose P, and the target pose $P_L$, internally generate different forward parameters $\alpha_1$, $\alpha_2, \ldots, \alpha_k$ in parallel and calculate new poses in parallel. The output is k sets of corresponding joint angle variables $\theta_1, \theta_2, \ldots, \theta_k$ and errors $e_1, e_2, \ldots, e_k$. The parameter calculator is configured to calculate forward parameters $\alpha_1$, $\alpha_2, \ldots, \alpha_k$ forward kinematics calculator. The forward kinematics calculator calculates the new joint angle variable and the new pose. The variable update module of the forward kinematics calculator calculates an increment $\Delta\theta$ of the joint angle variable and stores the increment $\Delta\theta$ into the register. The pose calculation module calculates a new pose according to the increment $\Delta\theta$ and transfers the new pose to the error calculator. The error calculator calculates an error between the new pose and the target pose. The controller is configured to control the order of execution of the variable update module, the register, the pose calculation module, and the error calculation. The forward kinematics calculator adopts a pipeline operation. The controller controls the variable update module to calculate the increment $\Delta\theta$ and then stores the increment $\Delta\theta$ into the register, and meanwhile controls the pose calculation module to calculate the new pose and controls the variable update module to continuously receive the forward parameter $\alpha_k$ for calculation of the increment $\Delta\theta$. The controller plays a scheduling role in the whole pipeline.

Figure 5:
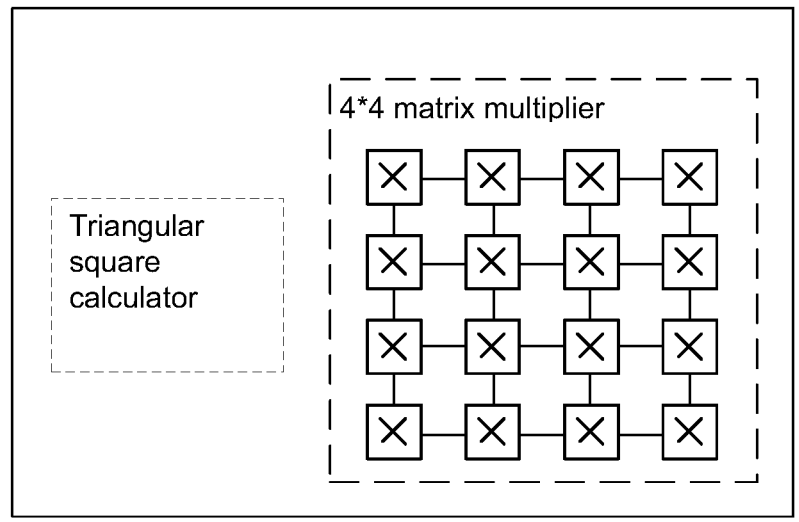
FIG. 5 shows a schematic diagram of a triangular square calculator and a 4*4 matrix multiplier according to an embodiment of the present invention.

FIG. 5 shows a block diagram of the Jacobian calculation unit according to an embodiment of the present invention. The Jacobian calculation unit includes a triangular square calculator and a 4*4 matrix multiplier.

Figure 6:
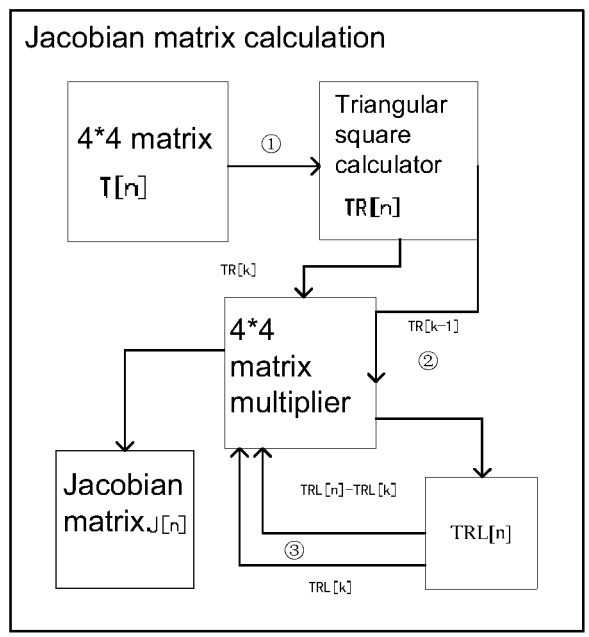
FIG. 6 shows an example of Jacobian matrix calculation according to an embodiment of the present invention.

FIG. 6 shows an example of the Jacobian matrix calculation by the Jacobian calculation unit in FIG. 5. In a first step, n 4*4 matrices T[n] are constructed according to joint angles $\theta_1, \theta_2, \ldots, \theta_k, \ldots, \theta_n$, and trigonometric functions of matrix elements are calculated by the triangular square calculator to obtain TR[n]. In a second step, the 4*4 matrix multiplier receives matrices TR[k] and TR[k-1] and performs a matrix multiplication operation to obtain TRL[n]. In a third step, TRL[n] is subtracted from TRL[k], and then multiplied by TRL[k] through the matrix multiplier to obtain a final Jacobian matrix J[n]. The calculation process does not mean that the calculation of n trigonometric functions or the matrix multiplication must be performed simultaneously. It is also possible that the Jacobian matrix is serially calculated by a pipelining technology.

In conclusion, the specific process of the multi-degree-of-freedom inverse kinematics solution system according to the present invention is as follows.

Step 1: The initialization module randomly generates a set of initial values of a joint angle variable, $\theta_{init}$, by the random signal generator, calculates an initial pose $P_{init}$ by use of the triangular square calculator and the 4*4 matrix multiplier, calculates an initial error error by use of an adder and the triangular square calculator, and transmits the parameters to the inverse kinematics scheduler.

Step 2: The inverse kinematics scheduler receives the parameter error and then determines, by use of a comparator, whether the error satisfies the precision requirement, that is, error<Threshold; if the error satisfies the precision requirement, a data selector selects an output circuit to output the joint angle variable $\theta$; or otherwise, the data selector selects a calculation circuit to transmit the joint angle variable $\theta$ to the Jacobian calculation unit for continuous execution.

Step 3: The Jacobian calculation unit receives the joint angle variable $\theta$, and calculates a Jacobian matrix J and a Jacobian transposed matrix $J^T$ by use of the triangular square calculator and the 4*4 matrix multiplier. The inverse kinematics scheduler controls the number of iterations of the Jacobian matrix calculation according to the input degree-of-freedom, and transmits the obtained Jacobian matrix J and Jacobian transposed matrix $J^T$ to each of the parallel pose update units (PUUs) at the end of the calculation.

Step 4: The pose update units calculate parameters $\alpha_1$, $\alpha_2, \ldots, \alpha_k$ according to the J, $J^T$ and error by use of the 4*4 matrix multiplier and transfers the parameters to the internal forward kinematics calculator (FKU).

Step 5: The variable update module in the forward kinematics calculator receives the error and $J^T$, calculates a joint increment $\Delta\theta$ by use of the 4*4 matrix multiplier and stores the joint increment $\Delta\theta$ into the register.

Step 6: The pose calculation module receives the $\Delta\theta$ in the register, and calculates a new pose P by use of an adder and the triangular square calculator.

Step 7: The error calculator calculates errors $e_1, e_2, \ldots, e_k$ between the new poses and the target pose by use of an adder and the triangular square calculator; and, the whole pose calculation units outputs k sets of new joint angle variables $\theta_1, \theta_2, \ldots, \theta_k$ and errors $e_1, e_2, \ldots, e_k$.

Step 8: The parameter selector selects the smallest error error from $e_1, e_2, \ldots, e_k$ by a comparator, selects a corresponding join angle variable θ by a data selector, and transmits the smallest error and the corresponding joint angle variable to the inverse kinematics scheduler.

Step 9: The inverse kinematics scheduler determines, by a comparator, whether the error satisfies the precision requirement, that is, error<Threshold; if the error satisfies the precision requirement, a data selector selects an output circuit to output the joint angle variable θ; or otherwise, the data selector selects a calculation circuit to transmit the joint angle variable θ to the Jacobian calculation unit, and step 3 is repeated for continuous execution.

It should be understood by those skilled in the art that the comparator, the determiner, the triangular square calculator and the like involved herein may be commercially-available standard devices, and the 4*4 matrix multiplier may also be a matrix multiplier of other dimensionalities.

Although various embodiments of the present invention have been described above, the foregoing descriptions are merely exemplary but not exhaustive, and are not limited to the disclosed embodiments. Numerous modifications and alterations will be apparent to a person of ordinary skill in the art without departing from the scope and spirit of the described embodiments. The terms used herein are selected to best explain the principles of the embodiments, practical applications or technical improvements in the market, or to enable those skilled in the art to understand the embodiments disclosed herein.

The invention claimed is:

1. An inverse kinematics solution system for control of a robot, the system comprising an interface, a parameter initialization module, an inverse kinematics scheduler, a Jacobian calculation unit, and a plurality of pose update units executed in parallel and a parameter selector, wherein:
    the interface is configured to receive a target pose value of the robot, and to send a joint angle value corresponding to the target pose value to the robot to control the motion of the robot;
    the parameter initialization module is configured to randomly generate an initial joint angle value, and to calculate an initial pose value based on the generated initial joint angle value and an initial error value of the initial pose value relative to the target pose value, and to send the initial joint angle value, the initial pose value and the initial error value to the inverse kinematics scheduler;
    the inverse kinematics scheduler is configured to compare the received error value to a predetermined threshold to determine whether to select the current joint angle value as the joint angle value corresponding to the target pose value or transmit the current joint angle value to the Jacobian calculation unit, wherein the current joint angle value is the initial joint angle value from the parameter initialization module or a joint angle value from the parameter selector;
    the Jacobian calculation unit is configured to obtain a Jacobian matrix and a Jacobian transposed matrix based on the received joint angle value, and to send the Jacobian matrix and the Jacobian transposed matrix to each of the plurality of pose update units;
    the plurality of pose update units is configured to generate different forward parameters in parallel and calculate new pose values in parallel based on the Jacobian matrix and the Jacobian transposed matrix, and to output each new joint angle value corresponding to each new pose value and each error value of each new pose value relative to the target pose value to the parameter selector; and
    the parameter selector is configured to select the smallest error value of the error values from the plurality of parallel pose update units and its corresponding joint angle value, and transmit the selected error value and joint angle value to the inverse kinematics scheduler; and
    wherein each of the pose update units comprises:
        a parameter calculator configured to calculate a forward parameter based on the Jacobian matrix, the Jacobian transposed matrix and the current error value;
        a variable update module configured to calculate an increment of a joint angle variable based on the forward parameter, the Jacobian transposed matrix and the current error value;
        a register configured to store the increment of the joint angle variable;
        a pose calculation module configured to calculate a new pose value according to the increment of the joint angle variable and the current joint angle value;
        an error calculator configured to calculate an error value between the new pose value and the target pose value; and
        a controller configured to control the execution of the variable update module, the register, the pose calculation module and the error calculator, and output a new joint angle value corresponding to the new pose value and the error value to the parameter selector.

2. The system according to claim 1, characterized in that the parameter initialization module comprises:
    a random signal generator, configured to randomly generate the initial joint angle value;
    a triangular square calculator and a matrix multiplier, configured to calculate the initial pose value; and
    an adder and a triangular square calculator, configured to obtain the initial error value between the initial pose value and the target pose value.

3. The system according to claim 1, characterized in that the inverse kinematics scheduler determines whether to select the current joint angle value as a joint angle value corresponding to the target pose value or transmit the current joint angle value to the Jacobian calculation unit by comparing an error corresponding to the current joint angle value with a predetermined threshold, wherein the error corresponding to the current joint angle value refers to an error between a pose value corresponding to the current joint angle value and the target pose value.

4. The system according to claim 1, characterized in that the Jacobian calculation unit comprises a triangular square calculator and a matrix multiplier, configured to obtain the Jacobian matrix and the Jacobian transposed matrix based on the current joint angle value.

5. The system according to claim 1, characterized in that the parameter calculator calculates the forward parameter by use of a matrix multiplier.

6. The system according to claim 5, characterized in that the matrix multiplier is a 4*4 matrix multiplier.

7. The system according to claim 1, characterized in that the pose calculation module calculates a new pose by use of an adder and a triangular square calculator.

8. The system according to claim 1, characterized in that the parameter selector comprises:
    a comparator configured to select the smallest error value of the error values from the plurality of parallel pose update units; and a data selector configured to select the joint angle value corresponding to the smallest error value, and transmit the selected error value and joint angle value to the inverse kinematics scheduler.

* * * * *